Feb. 23, 1965 D. G. GALLIE 3,170,632
VEHICLE HEATING AND VENTILATION SYSTEM
Filed Sept. 23, 1963 2 Sheets-Sheet 1

DANIEL G. GALLIE
INVENTOR.

BY John R. Faulkner
John J. Roethel

ATTORNEYS

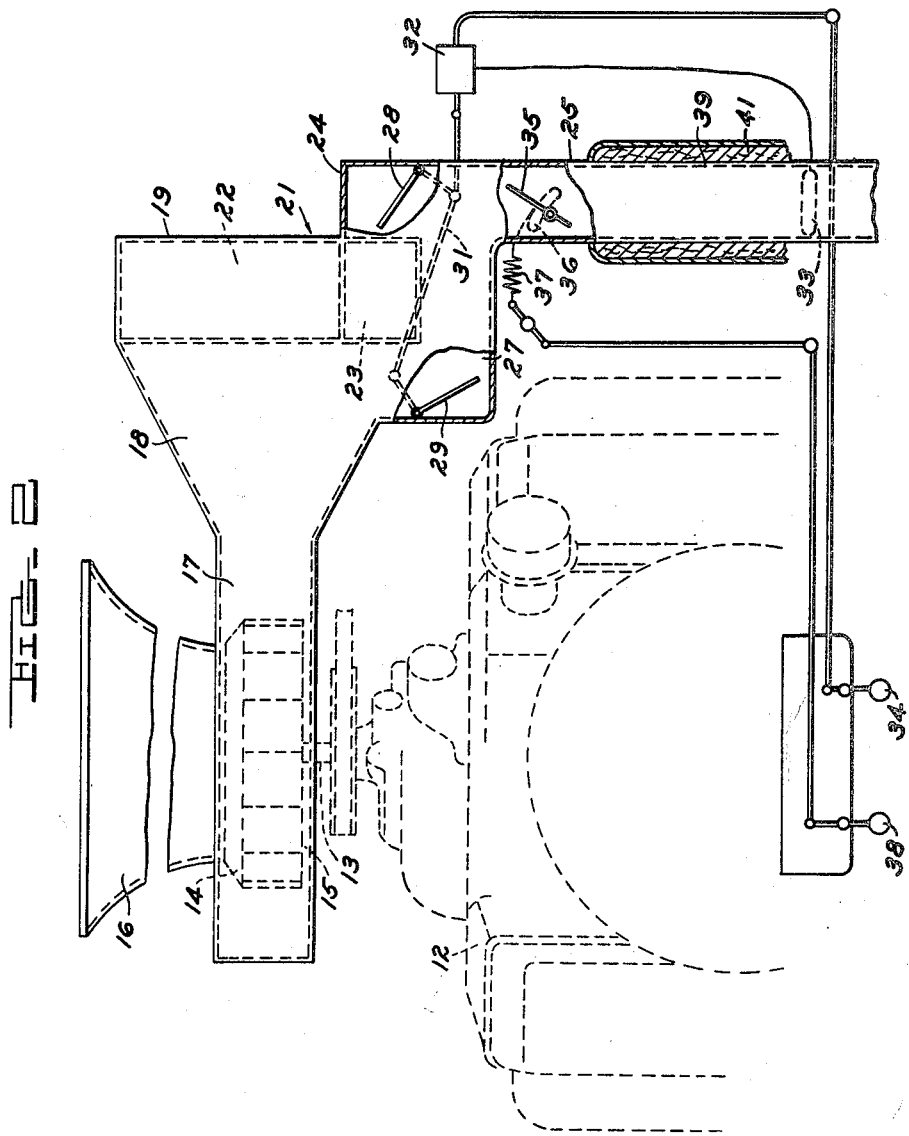

United States Patent Office 3,170,632
Patented Feb. 23, 1965

3,170,632
VEHICLE HEATING AND VENTILATION SYSTEM
Daniel G. Gallie, Allen Park, Mich., assignor to Ford Motor Company, Dearborn, Mich., a corporation of Delaware
Filed Sept. 23, 1963, Ser. No. 310,768
7 Claims. (Cl. 237—2)

This invention relates to an integrated engine cooling and passenger compartment heating and ventilation system for motor vehicles.

The operating temperatures of many vehicle engines are maintained below critical levels by the circulation of a liquid coolant through the engine. The coolant flows from the engine to a radiator or heat exchanger where atmospheric air is utilized as a heat sink in lowering the coolant temperature. In a conventional vehicle having the engine mounted in an engine compartment forwardly of the passenger compartment, the radiator is located forwardly of the engine and a propeller type fan is interposed between the radiator and the engine. The fan pulls cooling air through the radiator. This is a relatively inefficient arrangement for a number of reasons. A relatively large radiator front face area is required, the propeller type fan has low efficiency characteristics, and the hot air from the radiator is blown directly over the engine thus adding to the heat that the coolant is trying to remove.

It has been proposed to utilize a turbine type blower to push air through a radiator as distinguished from the common practice of pulling air therethrough. With a turbine type blower the traditional placement of the radiator ahead of the engine is not required and the radiator may be positioned at one side of the engine compartment so that the air is discharged through a side wall rather than into the engine compartment as in a conventional installation. A radiator having less frontal area and a thicker core may be used, the higher air pressure obtainable from the turbine blower permitting the desired air velocity through the radiator to be maintained. With a thicker core in the radiator, a higher air temperature rise will occur as the air passes through the core.

The pressurized fresh air available from the turbine blower system and the high temperature rise through the thick core provide the basic elements of a passenger compartment heating and ventilation system. In other words, the engine cooling system may be integrated with the passenger compartment heating and ventilation system.

It is an object of the present invention to provide an integrated engine cooling and passenger compartment heating and ventilation system that will effectively and efficiently heat and ventilate the vehicle passenger compartment. Since changing engine loads and speeds produce variable air flow rates and temperatures, it is a further object of the present invention to provide suitable regulation so that the temperature and rate of flow of the air to the passenger compartment may be selectively varied over a suitable range and, once the control device has been set to give a desired temperature and flow rate, the heating constants of the system will remain independent of the variables.

Basically, the integrated engine cooling and passenger compartment heating and ventilation system embodied in the present invention comprises an air intake blower, a heat exchanger adapted to receive engine coolant liquid and a duct means directing air flow from the blower through the heat exchanger. A second duct means is provided which is in part contiguous to a part of the heat exchanger and leads to the passenger compartment. Correlated damper means are provided which are operable to proportionately blend quantities of air taken from the duct between the blower and the radiator and the part of the second duct contiguous to the radiator. The quantities of air so blended will be determined by the appropriate setting of a control device located in the passenger compartment so that the blended air flowing to the passenger compartment through the second duct means will be at the desired temperature and rate of flow.

Other objects and features of the present invention will be made more apparent as this description proceeds, particularly when considered in connection with the accompanying drawings, wherein:

FIG. 3 is a schematic illustration in part similar to FIG. 1 illustrating a second embodiment of the present invention.

This application is a continuation-in-part of application Serial No. 183,005, filed March 22, 1962, which was a continuation-in-part of application Serial No. 43,583, filed July 18, 1960, both of which are now abandoned.

Figure 1:
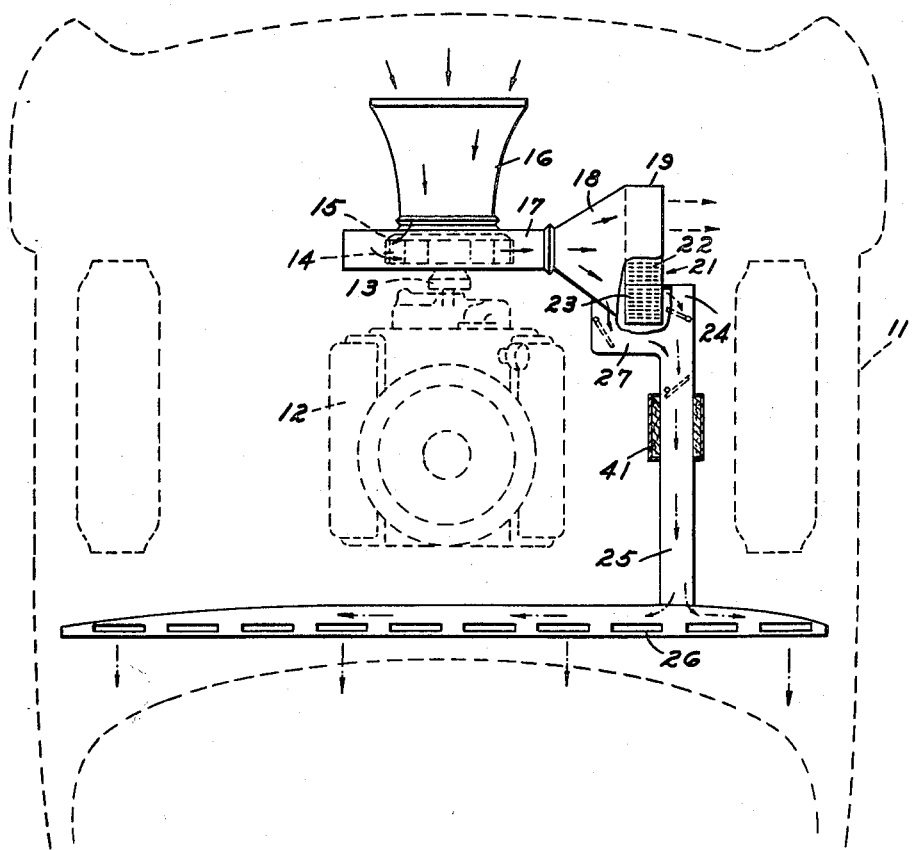
FIG. 1 is a schematic illustration of the integrated turbine blower engine cooling and passenger compartment heating and ventilation system embodying the present invention.

Referring now to the drawings, there is schematically illustrated in FIG. 1 the outline of the forward portion 11 of a vehicle. Conventionally housed within this forward portion 11 is a liquid cooled engine 12 provided with a forwardly extending accessory drive shaft 13.

In a conventional engine cooling system, a propeller type fan is mounted on the accessory drive shaft and a radiator is positioned on the front structure of the engine compartment to extend laterally across the path of air flow to the fan and engine. Coolant flowing from the engine to the radiator is cooled by air flow through the radiator, the air flow resulting from the forward motion of the vehicle and the air pulling effect of the fan located behind the radiator.

In the integrated vehicle cooling system and passenger compartment heating and ventilation system of the present invention, the accessory drive shaft 13 is coupled to a turbine type blower wheel or impeller 14 which is housed in a suitable casing 15. A bell mouth air intake 16 extends forwardly of the blower casing to axially direct air flow into the impeller casing. A laterally extending discharge duct 17 extends from the impeller casing toward the side of the vehicle where it is connected by a diffuser or diverging wall expansion duct 18 to the casing 19 of a radiator or heat exchanger 21.

It will be understood that the radiator casing is mounted on the fender apron or other side structural member of the vehicle body. If desired, the blower casing may be attached directly to the radiator casing as an integrated unit, provision being made to rotate the blower through a suitable belt drive system including a drive pulley mounted on the accessory drive shaft.

The radiator or heat exchanger 21 is provided with dual cores or sections 22 and 23 to provide separate coolant circuits so that engine thermostat cycling will not affect the passenger compartment heating function. That is, a separate coolant circuit for the heater section 23 of the radiator core bypasses the engine thermostat to offer faster heater warmup. The principle of this arrangement will be readily understood since it is utilized in conventional vehicle heating systems having a separate heater core remotely positioned from the engine coolant radiator.

The heater section or core 23 end of the radiator casing 19 is encompassed by the intake end 24 of a longitudinal duct 25 extending through the engine compartment firewall (not shown) to the distribution duct 26 located in the passenger compartment.

The intake end 24 of the duct 25 is provided with a branch 27 which taps directly into the diffuser or expansion duct 18 immediately ahead of the air flow entry side of the heater section or core 23 of the heat exchanger or radiator 21. This branch 27 is connected to the duct 25 rearwardly (with reference to the front end of the vehicle) of the portion of the duct 25 which picks up air flow from the air flow exit side of the heater section or core 23. The branch 27 provides a bypass path for air flow around the heater section or core 23, for a purpose to be explained. Air flow into the intake end 24 of the duct 25 and into its bypass branch 27 is controlled by face and bypass dampers 28 and 29, respectively. These dampers are linked together by a linkage system 31 and controlled by a controller 32 having a sensing element 33 located at the output end of the duct 25. A dash mounted lever 34 is provided to set the controller for any desired air temperature level.

Figure 2:
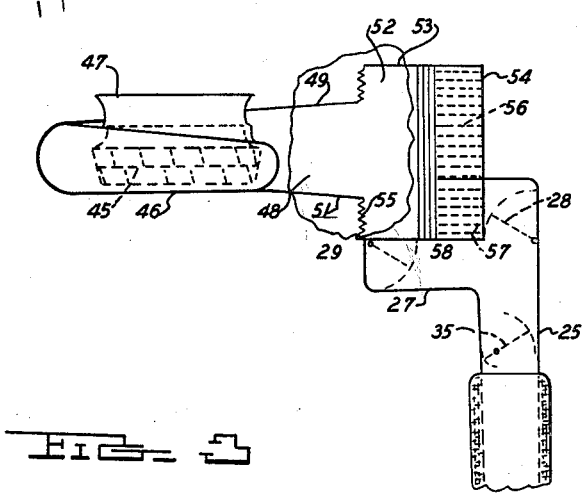
FIG. 2 is an enlarged schematic view in part similar to FIG. 1 illustrating in greater detail the arrangement of the system.

As best seen in FIG. 2, with both the face damper 28 and the bypass damper 29 in an open or partially open position, cool air to the air entry side of the heater core 23 is blended with heated air from the air exit side of the heater core 23. The temperature of the air flowing through the duct 25 is thus somewhere at a level between the cool air and the hot air temperatures. It will be readily understood that the bypass damper 29 may be completely open at which time the face damper 28 will be completely closed, and all of the air flowing into the duct 25 will be at the temperature of the cool air. Conversely, the bypass damper 29 may be completely closed at which time the face damper 28 will be completely open and the temperature of the air flowing through the duct 25 will be that of the heated air on the exit side of the heater core 23.

Since the blower impeller 14 is directly coupled to the accessory drive shaft of the engine, the speed of the impeller and therefore its discharge rate will vary as the engine load and speed varies. Provision is made for regulating the air flow rate through the duct 25 so as to make it relatively independent of the discharge rate or speed of the impeller 14. This is accomplished through a flow control damper 35 which is located in the duct 25. A cam 36 on the damper is spring loaded by a spring 37 to provide an increasing moment as the damper closes, thereby throttling the air for constant flow downstream. A dash mounted lever 38 resets the spring tension and offers an infinite selection of flow between the damper shut-off and wide open position.

A section of the air supply duct 25 between the radiator and the firewall is provided with perforated walls within an outer fabric liner 41. This acts as an effective noise controller for minimum sound level in the passenger compartment.

The operation of the integrated engine cooling and heating and ventilation system embodying the present invention is as follows: In the event that ventilation air from the heating and ventilation system is desired during warm weather, the passenger compartment occupant must first ascertain that the temperature control lever 34 is at the "off" position. In this position the cool air damper or bypass damper 29 is open and the hot air damper or face damper 28 is closed. If the flow control lever 38 is positioned at the fully "open" position, the passenger occupant will receive air at outdoor temperature. To throttle the quantity of air being received, it is only necessary to position the flow control lever to some desired intermediate position between "open" and "closed" positions. During cool weather, when it is desired to heat the passenger compartment, the temperature control lever 34 is set at a desired position between "off" and "hot." This automatically results in a relative positioning of the two dampers 28 and 29 in an attempt to satisfy the sensing element 33 of the damper controller 32. The cooler the air flowing through the heater core 23, the less amount of cool air that will be taken in through the bypass 27. When the cool air through the heater core 23 is cold, the bypass damper 29 will be fully closed and the face damper 28 will be fully open. As the heater core warms up, there will be a relative movement of the bypass damper 29 and the face damper 28 until a heat balance is achieved satisfying the sending element 33. The passenger occupant is initially required to set the flow control damper to provide the desired quantity of fresh air into the passenger compartment. Once set, the spring loaded damper 35 will throttle the air in varying degrees as the blower speed varies with variations in engine speed so as to maintain a substantially constant air flow rate.

The foregoing system, as described, provides an effective and efficient integration of the engine cooling and heating and passenger ventilation systems. One advantage of the integration is the elimination of the conventional heater core, fan and motor. An effective temperature control and the wide selection of air quantity are provided. Although high velocity air systems are inherently more noisy than the low velocity or low pressure systems, sufficient length is available along the duct 25 to incorporate a low cost silencer for quiet performance.

Referring now to FIG. 3, the embodiment of the present invention illustrated therein comprises certain refinements of the basic system described above.

The blower wheel, herein designated 45, is a mixed flow type impeller having radial and axial flow characteristics, which are considered most desirable for the present application. The housing for the blower wheel is a casing 46 having the form of a volute type scroll, i.e., one in which the width and radius in accordance with vortex law, or $RV_u = C$ where R is a given radius, $V_u$ is the tangential component of air velocity, and C is the impeller design constant.

As in the basic system, a bell mouth air intake 47 extends forwardly of the blower casing to axially direct air flow into the impeller. A laterally extending discharge duct 48 having slightly diverging walls, as indicated at 49 and 51, extends from the blower casing in the direction of the side of the vehicle engine compartment. The discharge duct 48 discharges into a chamber 52 of an abruptly stepped housing or casing 53 enclosing the heat exchanger 54.

The discharge opening area of the duct 48 is somewhat less than the area of the contiguous face of the expansion chamber 52 of the casing 53. To prevent engine fumes, road dust or the like from being drawn into the chamber 52, the exposed open face area is closed off by a flexible seal 55. It will be noted that the discharge end face of the duct 48, the intake end face of the chamber 52 and the flexible seal 55 all lie in substantially coplanar relationship.

The enlarged chamber 52 provides a convenient location for an air conditioning system condenser, as indicated at 58.

The foregoing arrangement results in a system in which the air diffusion zone comprises the optimum of a diffuser (duct 48) having minimum wall divergence and an abruptly stepped section (chamber 52) providing Borda-type expansion. This combination provides maximum efficiency in energy conversion from velocity to pressure. Or, stated otherwise, the system provides minimum energy loss in converting a portion of the velocity head at the blower outlet into a desired static head in the Borda-type expansion chamber at the heat exchanger inlet. Within the space available in an engine compartment, either a diffuser or a stepped section chamber acting alone is considerably less efficient than when acting in combination.

Reference may be made to Berry, Flow and Fan, 77 (1954), published by The Industrial Press, New York 13, New York, in which a duct system having a tapered wall portion discharging into an abrupt expansion portion has been called a "Gibson Enlargement." The author states that the advantages of such duct system are that space and cost can be reduced with only a slight decrease in efficiency of the system.

The abrupt enlargement or expansion portion of the duct system hereinafter may be defined specifically as a Borda-type expansion chamber, since the energy loss due to the abrupt expansion of an air stream entering an abrupt expansion chamber may be expressed by what is known as the Carnot-Borda equation, or more simply the Borda equation, see pages 26 and 27 of Berry, Flow and Fan.

The flexible seal 55 isolates the motion of the blower attached to the engine from the remainder of the system attached to the vehicle body. Since it is positioned at the open face of the stepped section of chamber 52, it can induce no further energy loss as the expansion losses are at a maximum value for the stepped section or chamber.

For simplification and minimum cost, the radiator 56 and heater section 57 of the heat exchanger 54 are equivalent in design and thermal capacity. An identical tube and fin density is utilized in both sections. This gives the same outlet air temperature for both sections when both are operative. As explained with reference to the basic system illustrated in FIGS. 1 and 2, the heater section always has coolant circulating through it and the radiator section has coolant circulating through it only when the engine thermostat is open.

The proportioning of the heater and radiator matrices to balance the peak operating characteristics of the blower at a given engine thermal load may be defined in terms of mass flow and temperatures of inlet air, mean coolant temperature, matrix face area, rows of tubes through the matrix and fin density. Additionally, the air leaving the heater matrix must be at a sufficient temperature level for passenger compartment heating purposes.

The following equations have been developed to derive the optimum radiator and heater matrix as a function of operating requirements without the necessity of resorting to iteration techniques, which are both tedious and time consuming.

(1) Thermal capacity of matrix in terms of air outlet temperature and flow rate:

$$t_2 = 2T_m - t_1 - K_1 F^{-N} V^M \text{ antilog}\left[\frac{1.35}{(\log R)}Z\right]$$

where:

$t_2$ = temperature of air leaving matrix (° F.)
$t_1$ = temperature of air entering matrix (° F.)
$T_m$ = mean temperature of coolant through matrix (° F.)
$K_1$ = coefficient with value of 3.70 for matrix construction
$F$ = fin density (fins per inch)
$N$ = fin effect (.2035)
$V$ = air velocity at matrix inlet (standard air in feet per minute)
$M$ = air velocity effect (.1312)
$R$ = rows of tubes through matrix
$Z$ = effect of tube rows (.0875)

(2) Pressure loss of air in flowing through matrix $$\Delta P = K_2 V^Q F^X \text{ antilog } 1.50 (\log R)^Y$$

where:

$P$ = pressure loss (inches of water)
$K_2$ = coefficient with value of $(21 \times 10^6)^{-1}$ for matrix construction
$V$ = air velocity at matrix inlet (standard air in feet per minute)
$Q$ = air velocity effect (1.5399)
$F$ = fin density (fins per inch)
$X$ = fin effect (1.0989)
$R$ = rows of tubes through matrix
$Y$ = effect of tube rows (.40403)

The foregoing equations may be readily utilized to determine the fin density and number of rows of tubes required to balance the peak operating characteristics of the blower, since the fin density F and the rows of tubes R are actually the only two dependent variables in the equations. The air velocity V for a given blower is determined by the noise level permissible. All of the items represent predetermined design characteristics or predetermined constants. The solution of the equations for the dependent variables becomes a simple matter of solving simultaneous equations having two unknowns. The equations may thus be used to determine the optimum matrix, i.e., fin density and number of rows or tubes, or, in the reverse, to determine if a proposed matrix will give the desired outlet temperature and pressure drop through the matrix.

It will be understood that the invention is not to be limited to the exact construction shown and described, but that various changes and modifications may be made without departing from the spirit and scope of the invention as defined in the appended claims.

I claim:

1. In a vehicle having a liquid cooled engine and a passenger compartment, an integrated engine cooling and ventilating system comprising a turbine blower rotatable about a longitudinal axis of the vehicle, a housing for said blower, a first duct means including at least a diffuser section, said first duct means being connected at one end to said housing and extending laterally of said longitudinal axis, an elongated heat exchanger connected to said engine to receive coolant therefrom, said heat exchanger extending longitudinally of said vehicle across the discharge end of said duct in position to receive the full discharge of said blower therethrough, the discharge area of said duct and the intake area of said heat exchanger being substantially coextensive, a second duct means extending longitudinally of said vehicle to said passenger compartment, said second duct means having an air intake portion enclosing a part of the air discharge side of said heat exchanger at one end of the latter to receive a portion of the air flow from the air discharge side thereof, the remainder of the air flowing through said heat exchanger being discharged laterally of said vehicle to the atmosphere, a bypass connection between said first and second duct means around said one end of the heat exchanger adapted to divert a part of the air flow from said duct means before passage through said heat exchanger, a plurality of dampers, one of said dampers being located in said air intake portion of said second duct means and another being located in said bypass connection, and means correlating the relationship of said dampers to proportionately blend air flowing into said second duct means through said bypass connection and from said heat exchanger to provide passenger compartment air at a desired temperature.

2. In a vehicle having a liquid cooled engine and a passenger compartment, an integrated engine cooling and ventilating system comprising a turbine blower rotatable about a longitudinal axis of the vehicle, a housing for said blower, a first duct means including at least a diffuser section, said first duct means being connected at one end to said housing and extending laterally of said longitudinal axis, an elongated heat exchanger connected to said engine to receive coolant therefrom, said heat exchanger being divided into two sections and extending longitudinally of said vehicle across the discharge end of said duct in position to receive the full discharge of said blower therethrough, the discharge area of said duct and the intake area of said heat exchanger being substantially coextensive, a second duct means extending longitudinally of said vehicle to said passenger compartment, said second duct means having an air intake portion enclosing the air discharge side of the heat exchanger section nearest said passenger compartment thereby to receive a portion of the air flow from the discharge side of said heat exchanger, the remainder of the air flowing through said heat exchanger being discharged through the other heat exchanger section laterally of said vehicle to the atmosphere, a bypass connection between said first and second duct means, adapted to divert a part of the air flow from said first duct means around said heat exchanger section nearest the passenger compartment before passage through said heat exchanger, a plurality of dampers, one of said dampers being located in said air intake portion of said second duct means and another being located in said bypass connection, and means correlating the relationship of said dampers to proportionately blend air flowing into said second duct means through said bypass connection and from said heat exchanger to provide passenger compartment air at a desired temperature.

3. In a vehicle having a liquid cooled engine and a passenger compartment, an integrated engine cooling and ventilating system comprising a turbine blower rotatable about a longitudinal axis of the vehicle, a housing for said blower, a first duct means including at least a diffuser section, said first duct means being connected at one end to said housing and extending laterally of said longitudinal axis, an elongated heat exchanger connected to said engine to receive coolant therefrom, said heat exchanger being divided into two sections and extending longitudinally of said vehicle across the discharge end of said duct in position to receive the full discharge of said blower therethrough, the discharge area of said duct and the intake area of said heat exchanger being substantially coextensive, a second duct means extending longitudinally of said vehicle to said passenger compartment, said second duct means having an air intake portion enclosing the air discharge side of the heat exchanger section nearest said passenger compartment thereby to receive a portion of the air flow from the discharge side of said heat exchanger, the remainder of the air flowing through said heat exchanger being discharged through the other heat exchanger section laterally of said vehicle to the atmosphere, a bypass connection between said first and second duct means adapted to divert a part of the air flow from said first duct means around said heat exchanger section nearest the passenger compartment before passage through said heat exchanger, a plurality of dampers, one of said dampers being located in said air intake portion of said second duct means and another being located being located in said by pass connection, means correlating the relationship of said dampers to proportionately blend air flowing into said second duct means through said bypass connection and from said heat exchanger to provide passenger compartment air at a desired temperature, and a flow control means located in said second duct means to maintain the flow of air into said passenger compartment at a desired rate.

4. In a vehicle having a liquid cooled engine and a passenger compartment, an integrated engine cooling and ventilating system comprising a turbine blower rotatable about a longitudinal axis of the vehicle, a housing for said blower, a first duct means including a diffuser section and a Borda-type expansion section, said first duct means being connected at one end to said housing and extending laterally of said longitudinal axis, an elongated heat exchanger connected to said engine to receive coolant therefrom, said first duct means Borda-type expansion section being interposed between said diffuser section and heat exchanger, said heat exchanger being divided in two sections and extending longitudinally of said vehicle across the discharge end of said duct in position to receive the full discharge of said blower therethrough, the discharge area of said duct and the intake area of said heat exchanger being substantially coextensive, a second duct means extending longitudinally of said vehicle to said passenger compartment, said second duct means having an air intake portion enclosing the air discharge side of the heat exchanger section nearest said passenger compartment thereby to receive a portion of the air flow from the discharge side of said heat exchanger, the remainder of the air flowing through said heat exchanger being discharged through the other heat exchanger section laterally of said vehicle to the atmosphere, a bypass connection between said first and second duct means adapted to divert a part of the air flow from said first duct means around said heat exchanger section nearest the passenger compartment before passage through said heat exchanger, a plurality of dampers, one of said dampers being located in said air intake portion of said second duct means and another being located in said bypass connection, means correlating the relationship of said dampers to proportionately blend air flowing into said second duct means through said bypass connection and from said heat exchanger to provide passenger compartment air at a desired temperature, said control means including a controller provided with a sensing element in said second duct means, and means to preset said controller to maintain the air to said passenger compartment at a desired temperature.

5. In an engine cooling system, an air intake blower, a volute type scroll housing said blower, a heat exchanger adapted to receive engine coolant, a housing for said heat exchanger, and an air diffusion system coupling said blower housing to said heat exchanger housing, said air diffusion system comprising a diffuser section coupled to said blower housing, said diffuser section having minimum wall divergence in a direction away from said blower housing and discharging into an abruptly stepped expansion chamber, said expansion chamber being coupled at its discharge end to the intake of said heat exchanger housing, said air diffusion system thereby being constructed and arranged to provide maximum efficiency in energy conversion from velocity head at the blower discharge to static head at the heat exchanger, and flexible seal means interposed between the outlet end of said diffuser section and the inlet of said expansion chamber to thereby isolate the blower vibrations from the heat exchanger structure, the outlet end of said diffuser section, the inlet end of said expansion chamber and said flexible seal lying in substantially coplanar relationship whereby said flexible seal creates substantially no energy loss in the system.

6. In an integrated engine cooling and passenger compartment heating and ventilation system, an air intake blower, a volute type scroll housing said blower, a heat exchanger adapted to receive engine coolant, a housing for said heat exchanger, and an air diffusion system coupling said blower housing to said heat exchanger housing, said air diffusion system comprising a diffuser section having minimum wall divergence and an abruptly stepped expansion chamber into which said diffuser section discharges, said blower being at the inlet of said diffuser section and said heat exchanger being at the outlet of said expansion chamber, said air diffusion system being constructed and arranged to provide minimum energy loss during the conversion of a portion of the velocity pressure existing at the blower outlet into static pressure at the heat exchanger, said static pressure being substantially equivalent to the pressure drop of air flow through said heat exchanger, and flexible seal means interposed between the outlet end of said diffuser section and the inlet of said expansion chamber to thereby isolate the blower vibrations from the heat exchanger structure, the outlet end of said diffuser section, the inlet end of said expansion chamber and said flexible seal lying in substantially coplanar relationship whereby said flexible seal creates substantially no energy loss in the system.

7. In an integrated engine cooling and passenger compartment heating and ventilation system, an air intake blower, a volute type scroll housing said blower, a heat exchanger adapted to receive engine coolant, a housing for said heat exchanger, and an air diffusion system coupling said blower housing to said heat exchanger housing, said air diffusion system comprising a diffuser section having minimum wall divergence and an abruptly stepped expansion chamber into which said diffuser section discharges, said diffuser section being connected to the discharge side of said blower housing and said expansion chamber being connected to the air intake side of said heat exchanger housing, said air diffusion system thereby being constructed and arranged to provide maximum efficiency in energy conversion from velocity head at the blower discharge to static head at the heat exchanger, flexible seal means interposed between the outlet end of said diffuser section and the inlet of said expansion chamber to thereby isolate the blower vibrations from the heat exchanger structure, the outlet end of said diffuser section, the inlet end of said expansion chamber and said flexible seal lying in substantially coplanar relationship whereby said flexible seal creates substantially no energy loss in the system, a first duct means in communication with said expansion chamber, a second duct means in communication with said first duct means and having a part contiguous to the discharge side of said heat exchanger and leading to said passenger compartment, and correlated damper means operable to proportionately blend a quantity of air taken from said expansion chamber through said first duct means with a quantity of air taken from the discharge side of said heat exchanger to provide passenger compartment air at a predetermined temperature.

References Cited in the file of this patent

UNITED STATES PATENTS

| | | |
|---|---|---|
| 2,186,145 | Perham | Jan. 9, 1940 |
| 2,383,640 | Findley | Aug. 28, 1945 |
| 2,430,759 | Crise | Nov. 11, 1947 |
| 2,473,281 | Findley | June 14, 1949 |
| 2,668,523 | Lamb | Feb. 9, 1954 |
| 2,814,448 | Schutt | Nov. 26, 1957 |